March 15, 1949.    C. E. TACK    2,464,754
BRAKE ROTOR
Filed Aug. 21, 1944    2 Sheets-Sheet 1
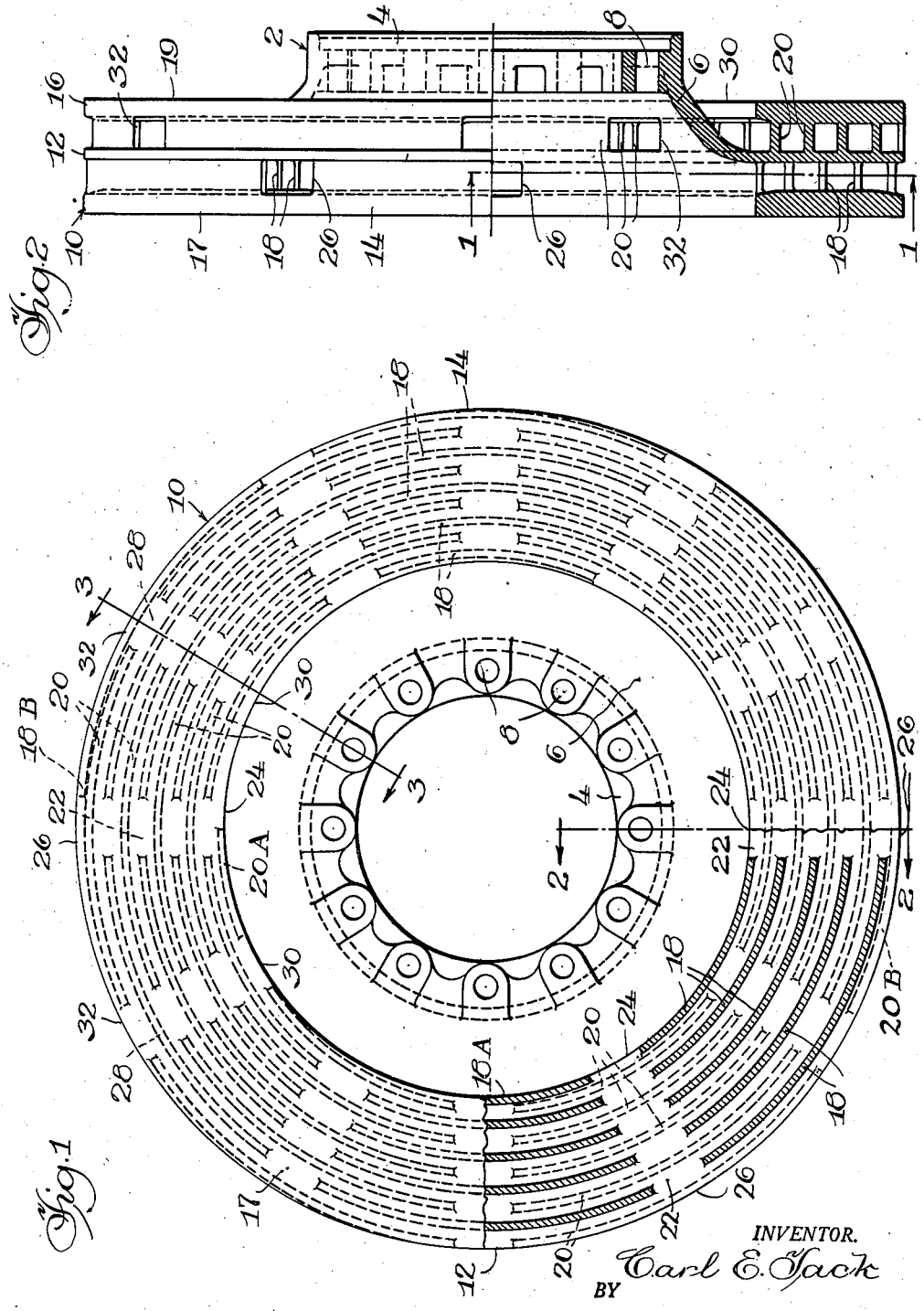

March 15, 1949.  C. E. TACK  2,464,754
BRAKE ROTOR
Filed Aug. 21, 1944  2 Sheets-Sheet 2
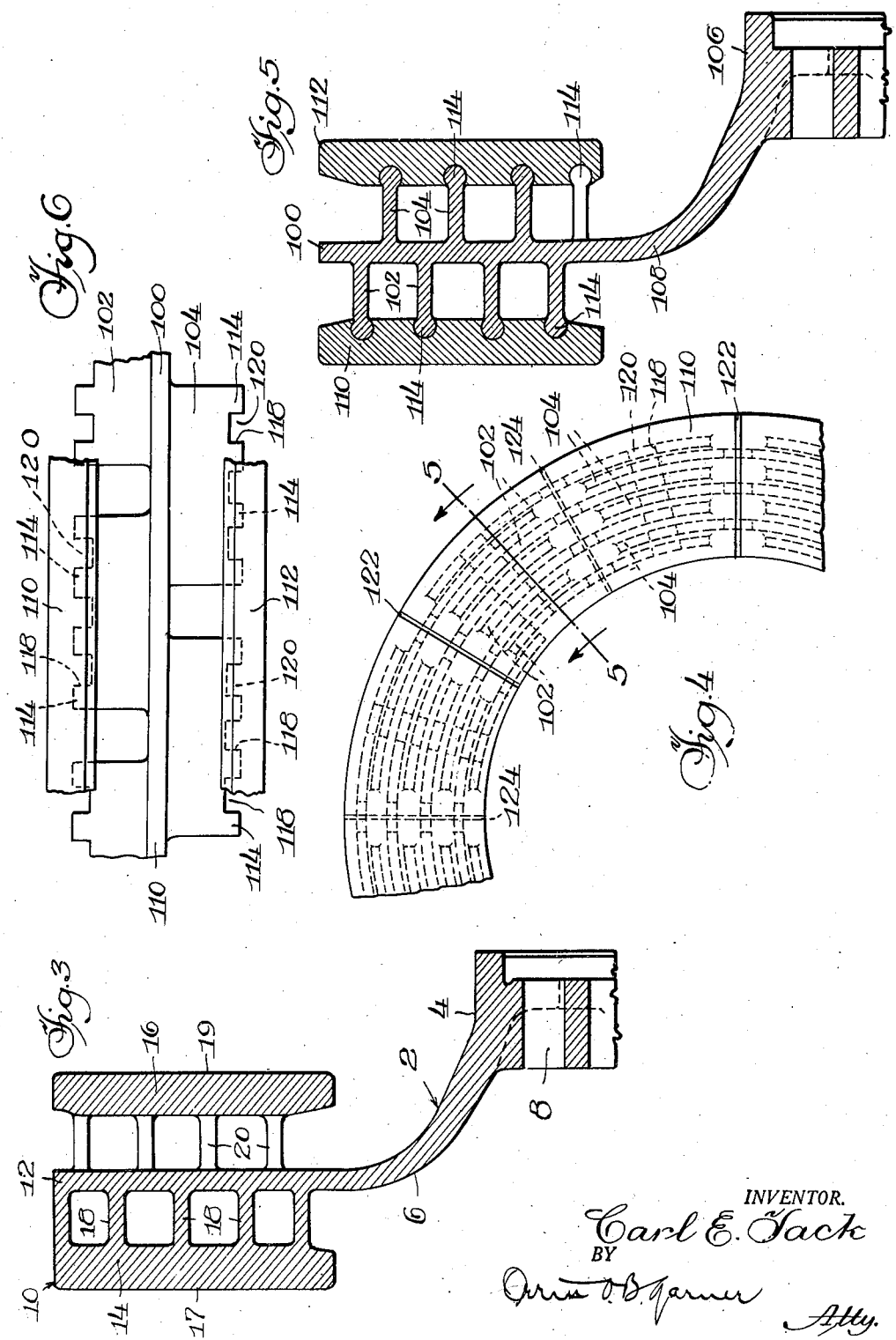
INVENTOR.
Carl E. Tack
BY
Atty.

Patented Mar. 15, 1949

2,464,754

UNITED STATES PATENT OFFICE 2,464,754

BRAKE ROTOR

Carl E. Tack, Chicago, Ill., assignor to American Steel Foundries, Chicago, Ill., a corporation of New Jersey Application August 21, 1944, Serial No. 550,333

7 Claims. (Cl. 188—218)

My invention relates to brake equipment and more particularly to brakes of the so-called disc type wherein a brake element or rotor is designed to be associated with other braking means commonly called stators or brake shoes, whose engagement with said rotor is commonly utilized as a means of stopping a wheel or other rotating member.

My novel rotor is particularly adapted for use with railway rolling stock and is so illustrated, although it will be understood that such a rotor may be utilized for any equivalent purpose for which it may be readily adapted.

In the present day high speed operation of trains, brake rotors of the type described above act as centrifugal blowers and usually employ radial cooling vanes for dissipating the tremendous amount of heat energy caused by the frictional engagement of the brakes with the rotor in stopping the train. The rotors revolve continually during the operation of the train which causes a continuous and considerable movement of air through the rotor due to its action as a centrifugal blower. This results in an unnecessary expenditure of energy at other times than in the braking operation. This undesirable expenditure of energy causes resistance retarding the speed of the train. As this resistance is proportionate to the square of the velocity of the train, the increased engine output necessary to overcome the same in maintaining a constant high speed may require as high as five additional horse power for each rotor, and, considering eight rotors are usually required in the brake equipment of each car, it may be seen that the additive resistance of the rotors in a train of cars considerably reduces the speed of train for a given power output or may require an additional effort of the engine to maintain constant speed.

A secondary disadvantage of such brake rotors is that the excessive heat energy generated during engagement of the braking surfaces of the friction plates or rings of the rotor with the brake shoes often causes radial cracks in the walls of the friction plates due to the failure of the material of the rotor to conduct the heat away rapidly enough from the braking surfaces of the plates. These cracks are usually confined to the portions of the walls between the vanes and breakages of the rotors may occur due to centrifugal force tending to separate the edge portions of the wall defining the radial crack.

It is the general object of my invention to provide a novel brake rotor having cooling vanes or blades which will effectively dissipate the heat energy due to the braking action of the train and which are so constructed and arranged in the rotor that radial cracks are obviated and resistance of the vanes to the passage of the air through the rotor is reduced to a minimum. In the preferred embodiment of the invention, these desirable and novel results are obtained by arranging the vanes as a discontinuous spiral web to afford a spiral passage for the air between a central supporting plate or ring and a friction plate or ring on each side thereof, suitable air inlets and outlets being formed in the inner and outer perimeters of the rotor, respectively, for the passage.

In the operation of the train, the vanes will be presented edgewise to the flow of air through the rotor whereby very little resistance of the vanes is had to the flow of air, while the centrifugal force generated during the operation of the train will force the air against the sides of the vanes and the interior surfaces of the plates, effecting the cooling of the braking surfaces of the friction plates by the transfer of heat therefrom to the vanes upon engagement of the brake shoes with the braking surfaces of the rotor in stopping the train. Also, as the tendency of the friction plates to crack usually occurs in the portions thereof between the vanes, radial cracking of the plates will be restrained.

My invention comprehends the construction of a novel rotor such as that described wherein the vanes or blades are formed integral with the plates of the rotor in such manner as to reduce to a minimum the weight of the rotor as a whole while, at the same time, so disposing the parts thereof as to meet maximum stress conditons encountered in use and also permitting convenient manufacturing practice.

My invention also contemplates the construction of a novel rotor such as that described wherein the vanes or blades are formed integral with one of the plates, and another plate is connected to the vanes by a casting operation in such manner that the latter plate is held against movement relative to the vanes during the engagement of the plates with the brake shoes.

In the drawings, Figure 1 is a side elevation partly in section of my novel rotor, the section being taken on the line 1—1 of Figure 2.

Figure 2 is an edge view taken from the right with a portion cut away along the radial planes indicated by the line 2—2 of Figure 1.

Figure 3 is an enlarged section taken on the line 3—3 of Figure 1.

Figure 4 is a fragmentary side elevation of a modification.

Figure 5 is an enlarged section taken on the line 5—5 of Figure 4.

Figure 6 is an enlarged fragmentary end view of the same.

Referring to the drawings and more particularly to Figures 1 to 3 inclusive, my novel rotor is formed as an integral iron casting and comprises a rotor support generally designated 2, said rotor support being of disc-like form including a hub portion 4 and a bell-like member 6, the shape of which will be best seen in the sectional view of Figure 3. The hub portion 4 may have any desired number of holes 8 for fastening the same to a wheel, as is well understood in the art.

The rotor 10 comprises three spaced annular plates or rings arranged in parallel planes, the central support ring or plate 12 being formed as a continuation of the bell-like member 6 of the rotor support and extending radially inwardly of the friction rings or plates 14 and 16, which may be disposed at opposite sides thereof for engagement of their braking surfaces 17 and 19 in the usual manner with stator members (not shown).

Extending outwardly from the opposite sides of the support member 12 are the cooling vanes or blades 18 and 20 respectively connecting the friction rings 14 and 16 to opposite sides of the ring 12. The vanes 18 and 20 are formed to provide a spiral passage for the air through the rotor between the support ring 12 and each of the rings 14 and 16. To this end, while the vanes or blades may be formed as a continuous helical web between the associated rings, for the purpose of providing a plurality of inlets and outlets for the more efficient circulation of air through the rotor the vanes are formed to provide arcuate segments arranged eccentrically of the horizontal axis of the rotor as a discontinuous web gradually expanding in spiral form from the inner to the outer perimeter of the rotor, the initial and terminating vanes for the spiral series between the ring 14 and the ring 12 being marked 18-A and 18-B, respectively, and the corresponding vanes for the spiral series between the friction ring 16 and the ring 12 being marked 20-A and 20-B, respectively.

As best seen in the section of Figure 1, the vanes 18 are arranged in superposed relation in spaced groups gradually increasing in length from the inner perimeter to the outer perimeter of the rotor to provide substantially equispaced radial passageways 22, between the groups of vanes, extending from the air inlets or intakes 24 to the air outlets 26. The vanes 20 are similarly arranged betwen the central ring 12 and the friction ring 16, having the radial passageways 28 extending from the air intakes 30 to the air outlets 32. It may be noted that the vanes 18 and 20 of each group are alternately arranged with respect to each other on opposite sides of the ring 12.

The operation of the device will be clearly understood from the structure. It may be summarized briefly as follows:

Upon the application of suitable stators or brake shoes to the surfaces 17 and 19, the rotation of the wheel associated therewith will slow down and eventually stop, which will cause generation of heat due to the kinetic energy consumed in braking.

The rotor, however, acts as a centrifugal blower and air will enter the intakes 24 and 30 between the rings for circulating the air through the spiral passageways defined by the vanes 18 and 20 on each side of the ring 12 to be exhausted through the outlets 26 and 32, respectively. It may be noted that while a portion of the air may eventually circulate entirely through the spiral passages, a substantial amount of the air will be continually forced outwardly of the rotor through the radial passageways 22 and 28 and the associated outlets 26 and 32, respectively, thus effecting a continuous and rapid cooling flow of air past the vanes and the inner surfaces of the friction rings and the support ring 12. Since the vanes and central ring 12 are integral with the friction rings, there will be a good flow of heat by conduction from the braking surfaces 17 and 19 of the rings to the vanes and ring 12, and consequently, in periods of long extended braking or quick emergency braking, sufficient heat will be dissipated thereby to keep the friction surfaces from overheating and possibly burning or otherwise injuring the brake shoes or the friction rings.

It will be apparent that in the high speed operation of the train, the spiral arrangement of the vanes will offer little resistance to the passage of air through the rotor as the edges of the vanes will be presented to the flow of air.

It may also be noted that, if either of the friction rings should crack during the braking action, the crack would occur between two of the superposed vanes in substantially parallel alignment therewith. In such case, the forces due to rotation will have no tendency to spread the crack and cause breakage of the ring.

The modification shown in Figures 4, 5 and 6 is similar to that just described with the exception that the central supporting ring 100 is formed integral with the cooling vanes 102 and 104 as well as the hub portion 106 and the bell-like member 108, as a steel forging for strengthening the rotor so that stresses encountered in service will not distort or destroy the rotor where it is attached to the rotating wheel or element, which is to be braked. The friction rings 110 and 112 are formed of cast iron and are united to the vanes 102 and 104, respectively, by a casting operation. The marginal edges of the vanes are formed with beaded portions 114, 114 about which are cast the rings 110 and 112, and relative movement of the portions is prevented by forming three notches 118 in each of the beaded portions 114 for engagement with lugs 120 of the rings, as best seen in Figure 6.

As the metal forming the friction rings and the metal forming the support plate and the vanes have different heat conductivities, provision is made for the resultant unequal expansion and contraction between the same during the braking operation by providing radial slots 122 and 124 in the friction rings 110 and 112, respectively, permitting relative movement of the rings and the vanes to obviate cracking of the friction rings during the high local heating occurring in the braking of the train.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. A brake rotor having a rotational axis, spaced friction surfaces adapted to rotate in unison about said axis, a coolant chamber between said surfaces, a helical vane in said chamber encircling said axis a plurality of times, and spaced passages through said vane extending approximately radially with respect to the axis from the inner perimeter to the outer perimeter of the chamber.

2. A brake rotor comprising at least two brake rings, a plurality of blades superposed radially with respect to the axis of the rotor interconnecting said rings and defining a helical fluid passage circling the axis of the rotor a plurality of times, said passage being open at the inner and outer peripheries of said rings, said blades also defining in the spaces therebetween a plurality of radial passages each intersecting said helical passage at a plurality of places.

3. A brake rotor comprising a pair of spaced friction rings, a support ring between said friction rings and a plurality of blades connecting each friction ring to said support ring, said blades defining with said plates fluid passages extending lengthwise circumferentially of the rotor and looped around the axis of the rotor a plurality of times, said blades also defining a plurality of passages extending lengthwise angularly with respect to the related fluid passages and communicating therewith.

4. A brake rotor comprising at least two spaced rings, each ring having a radial braking face, a plurality of blades forming a discontinuous spiral web circling completely around the axis of the rotor a plurality of times and providing a circuitous fluid passage with inlets and outlets disposed at the inner and outer perimeters of said rings, said blades being spaced circumferentially of the rotor to provide additional passages intersecting said circuitous passage at a plurality of points, said rings and said blades being formed of metal having different heat conductivities, radial slots in each friction ring dividing the same into circumferentially spaced segments, and means for attaching said rotor to a rotatable member to be braked.

5. A brake rotor comprising a ring and a plurality of spaced plates, friction surfaces on the remote sides of said plates, a plurality of blades interconnecting the ring and plates, said blades being arranged in groups on opposite sides of said ring, the groups on each side of the ring being arranged in an annular series about the axis of the rotor, each group comprising a plurality of blades superposed radially with respect to the axis of the rotor and with the groups of blades on the associated side of the ring defining a circuitous fluid passage circling the axis of the rotor a plurality of times, said groups also defining radial fluid passages therebetween intersecting the associated circuitous passage.

6. A brake rotor comprising spaced plates and a segmented web interconnecting said plates and looped in a regular spiral a plurality of times around the axis of the rotor to define a spiral fluid passage between said plates open at its extremities at the inner and outer peripheries of the plates to provide inlets and outlets for said passage, and radial passages intersecting said spiral passage intermediate the ends thereof and each of said radial passages having inlets and outlets at the inner and outer peripheries of said plates.

7. A brake rotor comprising a support plate with blade means on opposite sides thereof and a friction plate at each side of said support plate connected to the adjacent blade means, said blade means comprising a plurality of arcuate blades arranged in a spiral line to form a segmented web circling about the axis of the rotor a plurality of times, said web having its inner terminus at the inner periphery of said rotor and its outer terminus at the outer periphery of said rotor, the blades of each web being of gradually increased length as the outer terminus of the web is approached, said blades forming spiral fluid passages and intersecting radial fluid passages.

CARL E. TACK.

REFERENCES CITED

The following references are of record in the file of this patent:

UNITED STATES PATENTS

| Number | Name | Date |
|---|---|---|
| 1,367,343 | Anderson | Feb. 1, 1921 |
| 1,717,522 | Rosenberg | June 18, 1929 |
| 1,974,905 | Walker | Sept. 25, 1934 |
| 1,994,689 | Cooper | Mar. 19, 1935 |
| 2,215,421 | Eksergian | Sept. 17, 1940 |
| 2,243,334 | Eksergian | May 27, 1941 |
| 2,351,573 | Ledwinka | June 13, 1944 |
| 2,368,985 | Heater | Feb. 6, 1945 |

FOREIGN PATENTS

| Number | Country | Date |
|---|---|---|
| 1,324 | Great Britain | 1863 |